United States Patent [19]

Ida et al.

[11] Patent Number: 4,661,865
[45] Date of Patent: Apr. 28, 1987

[54] BATTERY HOLDER OF SINGLE HEAD MINIMUM SIZE CASSETTE TAPE PLAYER

[75] Inventors: Mitsuru Ida, Saitama; Minoru Shimada, Chiba, both of Japan

[73] Assignee: Sony Corporation, Tokyo, Japan

[21] Appl. No.: 615,791

[22] Filed: May 31, 1984

[30] Foreign Application Priority Data

Jun. 3, 1983 [JP]  Japan .............................. 58-84948[U]

[51] Int. Cl.$^4$ ............................................. G11B 15/66
[52] U.S. Cl. .................................... 360/96.6; 360/137
[58] Field of Search ............................. 360/96.6, 137

[56] References Cited

U.S. PATENT DOCUMENTS 3,521,010  7/1970  Sato ..................................... 360/137
4,542,431  9/1985  Ida ....................................... 360/137

*Primary Examiner*—Robert S. Tupper
*Attorney, Agent, or Firm*—Lewis H. Eslinger; Alvin Sinderbrand

[57] ABSTRACT

A cassette tape player is provided with a casing defining a compartment for receiving a cassette and including a hollow, box-like structure extending only partly across the casing to confront a corresponding portion of a long side of the cassette housing in the compartment, a battery receptacle extending longitudinally from the hollow, box-like structure across substantially the remainder of the casing for receiving at least one elongated cylindrical battery with the longitudinal axis of the latter extending parallel with the long side of the cassette housing in the compartment, and a closure engageable with the battery receptacle for retaining and locating said at least one battery in the receptacle and being configured to define, with the receptacle, a box-like extension of the hollow box-like structure which cooperates with the latter to define a substantially continuous surface for locating the cassette housing in the compartment.

10 Claims, 9 Drawing Figures

BATTERY HOLDER OF SINGLE HEAD MINIMUM SIZE CASSETTE TAPE PLAYER

BACKGROUND OF THE INVENTION

1. Field of the Invention

This invention relates generally to cassette tape players, and more particularly is directed to the battery holders thereof.

2. Description of the Prior Art

Battery operated portable cassette tape players are known in which the casing or cabinet of the player incorporates a box or holder for one or more batteries by which the player is to be operated. Recently, the trend has been to reduce as much as possible the size of portable cassette tape players, and the box or holder for the battery or batteries has become an important limiting factor in such trend towards miniaturization of cassette tape players.

In one existing cassette tape player, for example, as disclosed in detail, in U.S. Pat. No. 4,542,431 issued Sept. 17, 1985, and having a common assignee herewith, the cabinet of the cassette tape player includes a rectangular casing substantially corresponding, in its outlines, to the configuration of the housing of the cassette to be used therein, and having a chassis extending across the casing to define a compartment for the cassette thereabove which is to be closed by a cover or lid pivoted on the casing. Situated below the chassis are the motor and other mechanisms for driving the tape in the cassette housing situated in the compartment thereabove. The chassis has an opening therein through which a battery or batteries may be conveniently loaded into a battery box or container disposed below the chassis and adapted to be closed by a battery cover which lies substantially flush with the chassis to cooperate with the latter in defining the bottom surface of the compartment for the cassette. In this type of cassette tape player, it is difficult to substantially reduce the thickness of the cabinet, as such thickness must be sufficient to accommodate both the depth of the cassette chamber and the depth of the battery box or holder therebelow.

OBJECTS AND SUMMARY OF THE INVENTION

Accordingly, it is an object of this invention to provide a cassette tape player with a battery box or holder which will permit substantial reduction of the thickness of the player casing.

More specifically, it is an object of this invention to provide a portable cassette tape player with a battery box or holder which is located so as to be substantially accommodated in the thickness of the casing required for the compartment receiving the cassette housing so that the thickness of the player casing need not be further increased for accommodating the battery box of holder.

Still another object of the invention is to provide a portable cassette tape player, as aforesaid, in which the battery box or holder assists in locating a cassette housing in the chamber provided therefor.

In accordance with an aspect of this invention, a cassette tape player is provided with a casing defining a compartment for receiving a cassette and which includes a hollow box-like structure extending only partly across the casing to confront a corresponding portion of a long side of the cassette housing, a battery receptacle extending longitudinally from the hollow box-like structure across substantially the remainder of the casing for receiving at least one elongated cylindrical battery with the longitudinal axis of the latter extending parallel with the long side of the cassette housing in the compartment, and a closure engageable with the battery receptacle for retaining and locating at least one battery in the receptacle and being configured to define, with the receptacle, a box-like extension of the hollow box-like structure which cooperates with the latter to define a substantially continuous surface for locating the cassette housing in the compartment.

In a preferred embodiment of the invention, the cassette locating surface of the hollow box-like structure has spaced apart openings therein to register, at least partly, with respective conventional windows spaced apart in the peripheral wall of the cassette housing, and the cassette tape player further includes a reproducing head mounted within the hollow box-like structure and engageable through one of the openings and the registered window with the tape in the cassette housing, and a pressure roller also mounted within the hollow box-like structure and engageable with the tape through the other registered opening and window for urging the tape against a rotatable capstan which projects upwardly into a cassette housing located in the compartment.

The above, and other objects, features and advantages of the invention, will be apparent in the following detailed description of an illustrative embodiment thereof which is to be read in connection with the accompanying drawings wherein corresponding parts are identifed by the same reference numerals in the several views.

DESCRIPTION OF A PREFERRED EMBODIMENT

An embodiment of the present invention will now be described in detail with initial reference to FIGS. 1-4 of the accompanying drawings which show the invention applied to a portable cassette tape player 100 for the stereo reproduction or playback only of audio signals recorded on a magnetic tape of a conventional compact cassette 101 shown particularly on FIG. 4 and hereinafter referred to simply as a "cassette". As shown, the player 100 comprises a casing 1 which includes a main section 1a and an auxiliary section 1b movable relative to each other between a compact or contracted condition (FIG. 1) and an expanded or operative condition (FIGS. 2-4).

The main section 1a of casing 1 is desirably pressed of sheet metal and has a bottom wall $1a_1$ (FIGS. 3,7 and 9) with side walls $1a_2$ and a front wall $1a_3$ extending from the respective margins of bottom wall or base $1a_1$. As shown particularly on FIGS. 2,3 and 4, the portions of base $1a_1$ and side walls $1a_2$ remote from front wall $1a_3$ are inwardly offset, as indicated at $1a'_1$ and $1a'_2$. Further, side walls $1a_2$ desirably are formed, along most of their lengths, to have a height approximately one-half the height of front wall $1a_3$.

Figure 1:
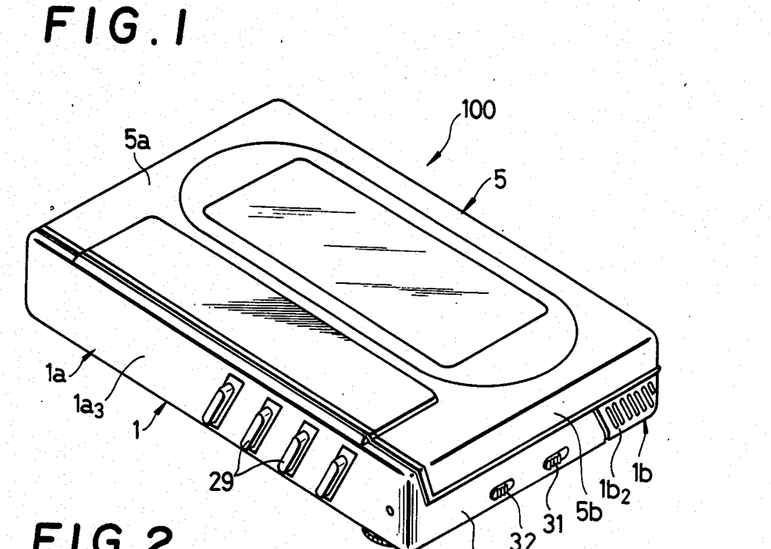
FIG. 1 is a perspective view of a portable cassette tape player according to an embodiment of this invention which is shown with its casing contracted and with its lid or cover closed.
Figure 2:
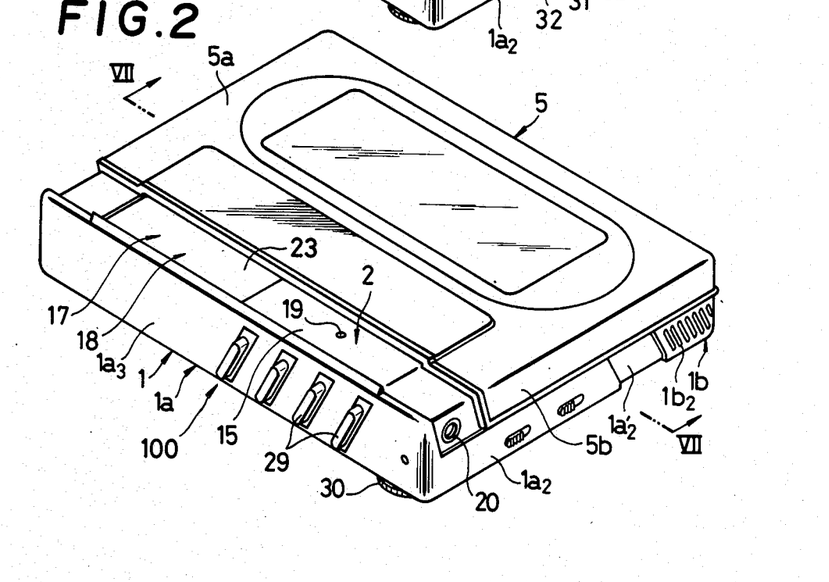
FIG. 2 is a view similar to that of FIG. 1, but with the casing of the portable cassette tape player shown in its extended condition for receiving a cassette therein.
Figure 3:
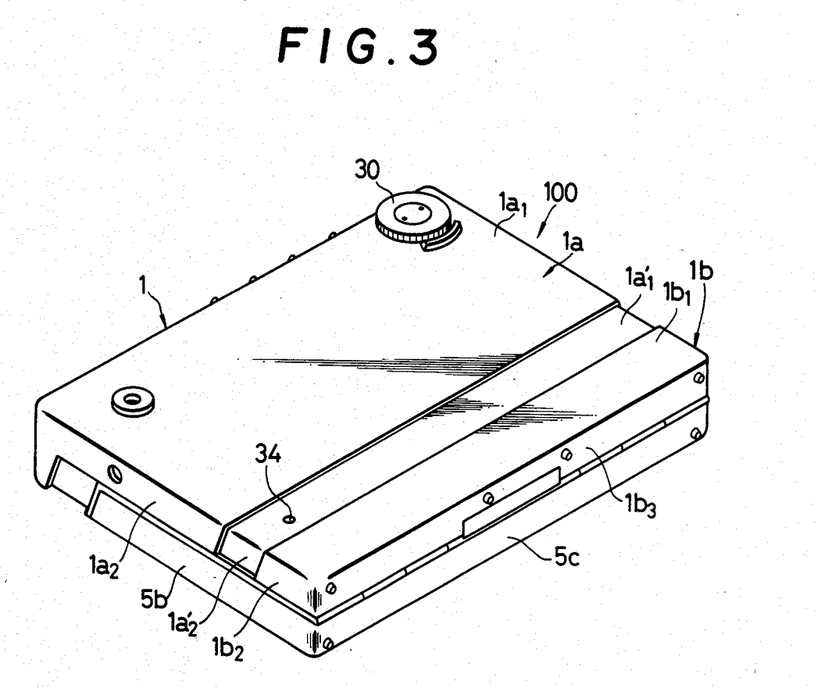
FIG. 3 is a perspective view showing the underside of the cassette tape player in its extended condition.

The auxiliary section 1b of casing 1 is shown to have a bottom wall $1b_1$ slidable against the outer or under surface of the offset back portion $1a'_1$ of the bottom wall or base $1a_1$ of main section 1a, side walls $1b_2$ slidable against the outer surfaces of the offset back portions $1a'_2$ of side walls $1a_2$ and a back wall $1b_3$ (FIG. 3). Side walls $1b_2$ and back wall $1b_3$ desirable have a height approximately equal to the height of side walls $1a_2$ along the major portion of the length of the latter. As hereinafter described in detail, auxiliary section 1b of the casing is mounted for movement relative to main section 1a in the direction toward and away from the front wall $1a_3$ of the latter between a contracted position (FIG. 1) in which player 100 is compact for ease in carrying or storing the same, and an extended position (FIGS. 2-4) in which a cassette 101 can be accommodated therein.

Figure 4:
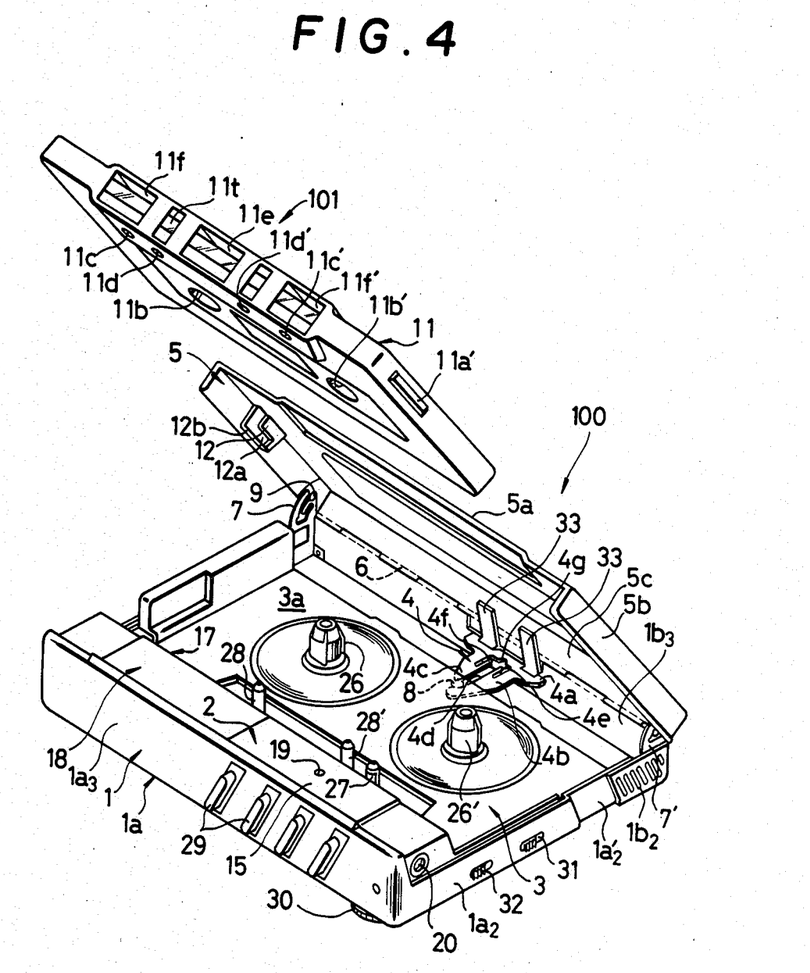
FIG. 4 is a view similar to that of FIG. 2, but with the lid of the portable cassette tape player shown raised to its opened position to permit the insertion or removal of a cassette.
Figure 9:
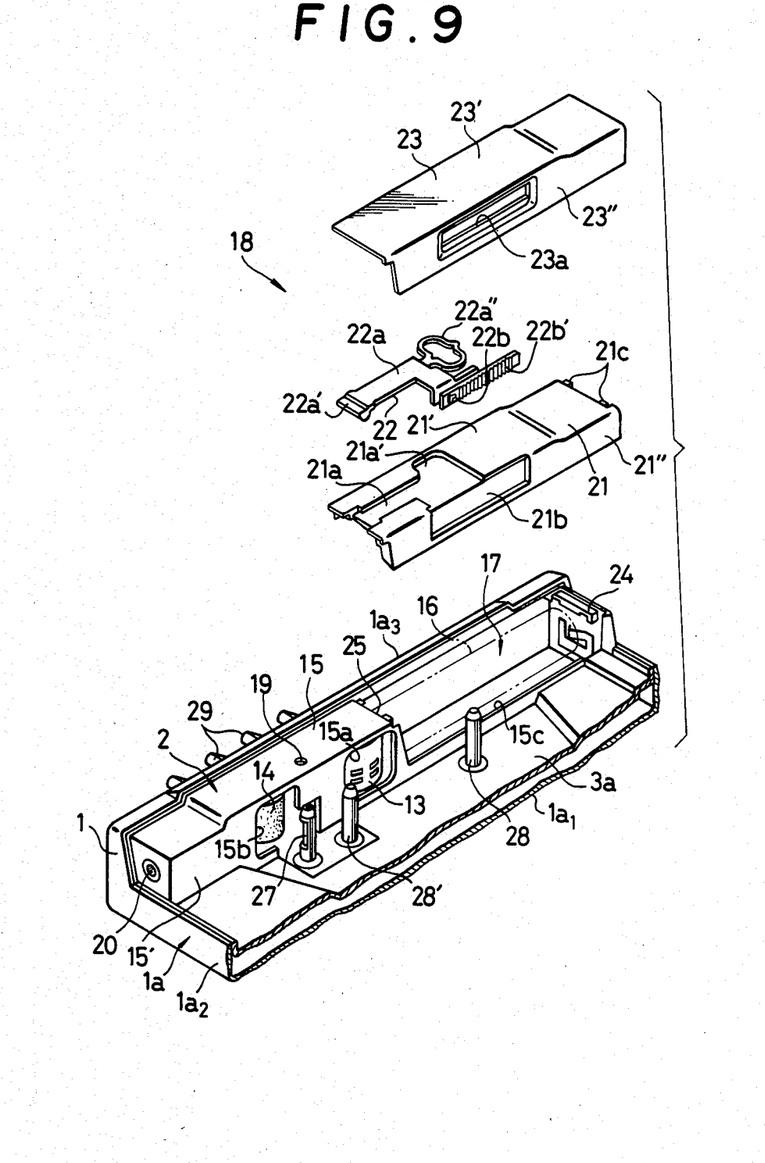
FIG. 9 is an exploded perspective view showing details of the portable cassette player provided with a battery box according to the present invention.

As shown particularly on FIGS. 2,4 and 9, main section 1a of casing 1 has a hollow, box-like structure 2 extending only slightly more than halfway across casing 1 immediately in back of front wall $1a_3$. Further, a chassis 3a (FIGS. 4,7 and 9) extends between side walls $1a_2$ of main section 1a and is spaced from base or bottom wall $1a_1$ to provide a space therebetween for accommodating mechanisms (not shown) for driving the tape of a cassette 101 operatively positioned within casing 1, and also for accommodating circuits by which recorded audio signals are reproduced. When auxiliary section 1b of casing 1 is in its extended position relative to main section 1a, the resulting enlarged space or distance between box-like structure 2 and back wall $1b_3$ of the auxiliary casing section provides a compartment 3 above chassis 3a in casing 1 of a size sufficient to accommodate cassette 101 therein.

A guide bracket 4 is suitably secured at the center of back wall $1b_3$ of the auxiliary casing section and extends forwardly therefrom between chassis 3a and the bottom wall $1a_1$ of main section 1a for guiding and limiting the relative movements of the casing sections and for yieldably retaining sections 1a and 1b in their extended and contracted positions relative to each other, as hereinafter described in detail.

Portable cassette tape player 100 is further shown to have a lid or cover 5 constituted by a top wall 5a and side walls 5b and a back wall 5c depending from the respective margins of top wall 5a and having a height approximately equal to one-half the height of front wall $1a_3$. Cover 5 is hingedly mounted on casing 1 by means of a piano hinge 6 connecting back walls $1b_3$ and 5c of auxiliary casing section 1b and cover 5, respectively. Positioning brackets 7 and 7' are secured at the inner sides of side walls $1b_2$ of auxiliary casing section 1b adjacent back wall $1b_3$ and are engageable with cover 5, as hereinafter described in detail, for releasably retaining the cover in either its closed position (FIGS. 1-3) or its pivotally raised or opened position (FIGS. 4 and 6).

When casing sections 1a and 1b are in their relatively contracted position and cover 5 is closed (FIG. 1), the forward edge portion of top wall 5a of the cover extends over box-like structure 2 and the depending side walls 5b of the cover abut the top edges of the side walls $1a_2$ and $1b_2$ of the casing sections so as to complete the enclosing of casing 1. In such condition of casing 1 and cover 5, the size of tape player 100 is substantially the same as that of the housing 11 of a cassette 101 to be used with the tape player 100. Cover 5 is dimensioned so that, even when casing sections 1a and 1b are moved to the relatively extended condition thereof for accommodating a cassette 101 in the resulting compartment 3, the cover 5, in its closed position (FIG. 2), will enclose the cassette in such compartment.

Figure 5:
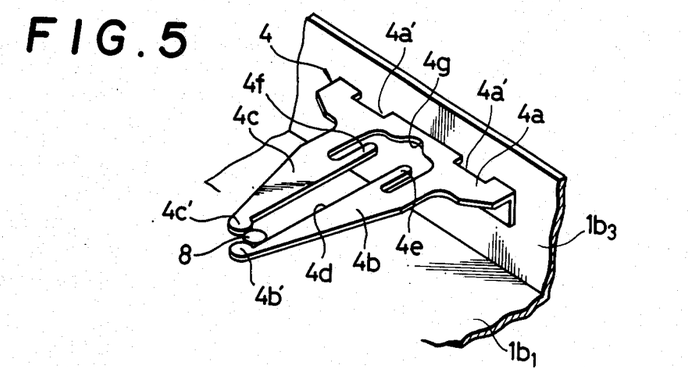
FIG. 5 is a fragmentary, enlarged perspective view of a guide bracket by which extending and contracting movements of the player casing are guided and limited.

Referring in detail to FIG. 5, it will be seen that guide bracket 4, which is desirably formed of resilient or spring metal, includes a laterally extending base portion 4a secured to the inner surface of back wall $1b_3$, and a pair of laterally spaced guide arms 4b and 4c extending forwardly from base portion 4a and defining a slot 4d therebetween. Arms 4b and 4c have inwardly directed rounded ends 4b' and 4c', and arm 4b is substantially longer than arm 4c. Thus, rounded ends 4b' and 4c' restrict slot 4d at spaced apart locations along the forward end portion of the slot. Further, at the end of slot 4d adjacent base portion 4a, resilient fingers 4e and 4f extend from arms 4b and 4c, respectively, and are slightly angled toward each other for narrowing or restricting slot 4d adjacent base portion 4a which is formed with a central arcuate recess 4g. Guide bracket 4 is located so that its arms 4b and 4c extend forwardly from back wall $1b_3$ of casing section 1b in the space between chassis 3a and bottom wall $1a'$ of casing section 1a. A pin 8 (FIGS. 4 and 5) depends centrally from chassis 3a adjacent the back edge of the latter and is received in slot 4d. Pin 8 is diametrically dimensioned to fit relatively closely in slot 4d so that, when auxiliary casing section 1b is in its contracted position relative to main casing section 1a, pin 8 will be in back of, and resiliently acted upon by the ends of fingers 4e and 4f so as to be yieldably held against arcuate recess 4g, thereby providing a detent action for retaining casing sections 1a and 1b in the contracted condition. On the other hand, when casing section 1b is manually displaced so as to overcome such detent action and is moved to its extended position, pin 8 is moved past end portion 4c' and engaged between the rounded end portions 4b' and 4c' of resilient arms which again provide a detent action for yieldably retaining casing sections 1b and 1c in their relatively extended condition.

Figure 6:
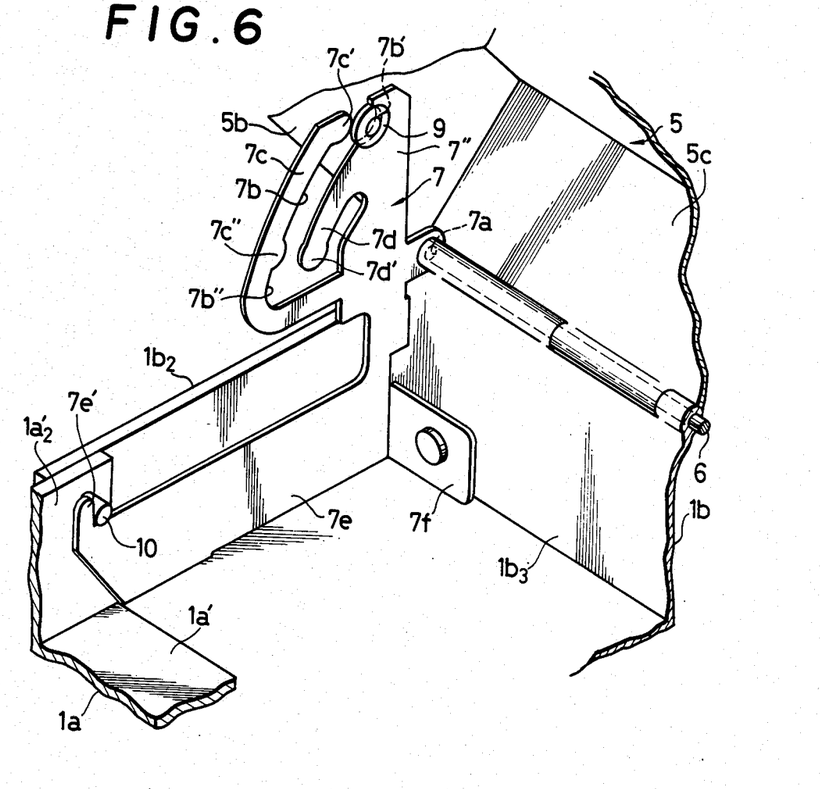
FIG. 6 is an enlarged, fragmentary perspective view of one of a pair of positioning brackets provided for controlling movements of the lid or cover of the casing.

Referring now to FIG. 6, it will be seen that each of the positioning brackets 7,7' is also formed of resilient or spring metal and includes a generally sector-shaped body 7" with a tab extending therefrom and having a hole 7a for receiving an adjacent end of the pin of hinge 6. The sector-shaped body 7" is formed with an arcuate slot 7b concentric with hole 7a and being defined between outer and inner arcuate fingers 7c and 7d, respectively, which extend in opposite directions toward their free ends. A pin 9 projects inwardly from each cover side wall 5b into the slot 7b of the adjacent positioning bracket 7 or 7'. A rounded enlargement 7d' is formed at the free end of finger 7d and is located across slot 7b from a rounded enlargement 7c" provided on finger 7c so that slot 7b is narrowed or restricted at the location between rounded enlargements 7d' and 7c". Below the restriction defined by rounded enlargements 7d' and 7c", slot 7b opens into a rounded end portion 7b". At the upper end of slot 7b, the free end portion of finger 7c is formed with an inwardly enlarged end portion 7c', while the opposite edge of slot 7b is formed with an arcuate recess 7b'. Disposed below the sector-shaped body 7", each of the positioning brackets 7,7' has a forwardly directed guide member 7e which is spaced inwardly from the adjacent side wall $1b_2$ of auxiliary casing section 1b so as to be slidable against the inner surface of the offset rear portion $1a'_2$ of the adjacent side wall of main casing section 1a. A projection 7e' extends upwardly from the forward end of guide member 7e, and a pin 10 is directed inwardly from side wall portion $1a'_2$ and is slidable along the upper edge of guide member 7e to engage projection 7e' when casing sections 1a and 1b are in their relatively extended condition shown on FIG. 6. It will be appreciated that the engagement of projection 7e' with pin 10 ensures that pin 8 will not cause excessive strain on arms 4b and 4c of guide bracket 4 in the event that casing sections 1a and 1b are forceably moved to their extended condition. At the back end of each guide member 7e, there is an inwardly directed tab 7f which is riveted or otherwise secured to the back wall $1b_3$ of casing section 1b for securely anchoring the respective positioning bracket 7,7' in respect to the auxiliary casing section 1b.

It will be appreciated that, when cover 5 is raised to its opened position shown on FIGS. 4 and 6, each of the pins 9 moves upwardly along the respective arcuate slot 7b past the rounded enlargement 7c' at the free end of finger 7c which acts as a detent for holding the respective pin 9 in the arcuate recess 7b'. Thus, the cover 5 is releasably retained in its opened position. When cover 5 is manually displaced to its closed position, each pin 9 is forced past the detent constituted by the rounded enlargement 7c' at the end of resilient finger 7c and then moves along arcuate slot 7b past the restriction therein constituted by the rounded enlargement 7c" and the end 7d' of resilient finger 7d and which form another detent for holding the respective pin 9 in the rounded end portion 7b" of the slot with cover 5 in its closed position. Accordingly, cover 5 is then yieldably held in its closed position until it is manually raised to force each pin 9 past rounded enlargement 7c".

Further, guide member 7e of each positioning bracket 7,7', in bearing slidably against the inner surface of the adjacent side wall portion $1a'_2$ while the outer surface of the latter is slidably engaged by adjacent side wall $1b_2$ ensures that the front wall $1a_3$ and back wall $1b_3$ of casing sections 1a and 1b, respectively, remain parallel to each other while moving between their extended and contracted conditions. Furthermore, the engagement of each pin 10 against the upper edge of the respective guide member 7e in any position of auxiliary casing section 1b relative to main casing section 1a, and the engagement of pin 10 with projection 7e' in the relatively extended condition of the casing sections serve to avoid relative rotational movements of casing sections 1a and 1b when cover 5 is angularly displaced between its opened and closed positions.

Figure 7:
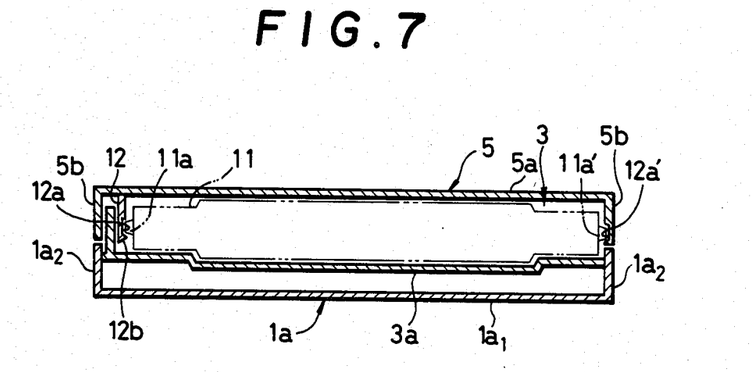
FIG. 7 is a transverse sectional view taken along the line VII—VII on FIG. 2 for showing the manner in which a cassette within the casing of the portable cassette tape player is engaged by the lid in the closed position of the latter.
Figure 8:
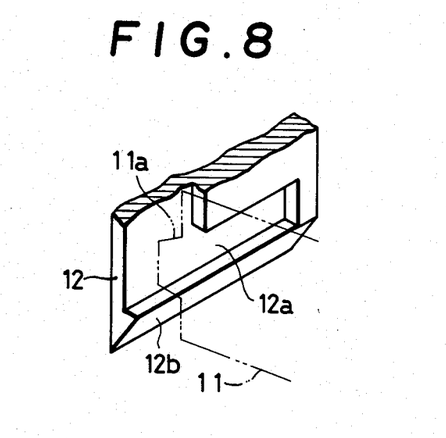
FIG. 8 is an enlarged, fragmentary perspective view showing details of a resilient tab on the lid for engagement with the cassette housing.

Referring now to FIG. 7, it will be seen that a laterally resilient tab 12 depends from the top wall 5a of cover 5 at a location spaced a relatively small distance inwardly from one of side walls 5b. Such laterally resilient tab 12 is formed with an inwardly opening shallow groove 12a which is adapted to receive one of the similarly shaped projections 11a and 11a' conventionally extending from the peripheral wall of the cassette housing 11 at the opposed relatively short sides thereof, as indicated in dot-dash lines. The bottom edge of laterally resilient tab 12 is bevelled, as indicated at 12b on FIGS. 7 and 8. Further, the side wall 5b of cover 5 remote from tab 12 is formed with an inwardly opening shallow groove 12a' adapted to receive the adjacent projection 11a' on the cassette housing 11.

It will be apparent that, with cover 5 in its opened position shown on FIG. 4, housing 11 of a cassette 101 can be slidably inserted downwardly and rearwardly into opened cover 5 with projection 11a' at one short side of the cassette housing being received in the groove 12a' of one of the cover side walls 5b, while the projection 11a at the opposite short side of the cassette housing is slidably received in the groove 12a of tab 12. Thereafter, when cover 5 is moved downwardly to its closed position, housing 11 of a cassette 101 previously disposed in the cover will be carried thereby into an operative position in compartment 3. When cover 5 is subsequently raised to its opened position, the engagement of projections 11a and 11a' in grooves 12a and 12a' of cover 5 causes the cassette housing 11 to be carried along with the cover, and thereby removed from compartment 3, to the opened position of the cover at which the cassette can be easily removed.

Alternatively, with cover 5 in its opened position, a cassette 101 can be loaded directly into compartment 3. When cover 5 is thereafter displaced downwardly to its closed position, the bevelled lower edge 12b of laterally resilient tab 12 rides downwardly over projection 11a on the adjacent short side of the cassette housing while tab 12 flexes outwardly until, in the fully closed position of the cover, projection 11a engages in groove 12a and the other projection 11a' engages in groove 12a'. When the cover 5 is later opened, the cassette in compartment 3 is again carried upwardly by the cover 5 by reason of the engagement of projections 11a and 11a' in grooves 12a and 12a', respectively. Therefore, whether the cassette is loaded directly into compartment 3 or first inserted in the opened cover 5 so as to be carried into compartment 3 in response to the movement of cover 5 to its closed position, the subsequent movement of the cover 5 from its closed position to its opened position is effective to carry the cassette out of compartment 3 for easy removal from the cover.

As is shown particularly on FIG. 4, the generally rectangular housing 11 of a standard cassette 101 has laterally spaced apart openings 11b and 11b' in its opposed panels or top and bottom walls through which supply and take-up reel shafts 26 and 26' extending upwardly from chassis 3a can project for engagement with supply and take-up reels (not shown) within cassette housing 11 when the latter is operatively positioned in compartment 3. Housing 11 of the conventional cassette 101 is further shown to have a central window 11e and two opposite side windows 11f and 11f' spaced apart along a relatively long side of the peripheral wall of rectangular housing 11. The tape 11t wound on the supply and take-up reels in the housing is guided in a run therebetween along the long side of the housing having windows 11e, 11f and 11f' therein for exposure of the tape at such windows. The top and bottom walls of housing 11 are also formed with aligned openings 11c and 11c' disposed in back of windows 11f and 11f', respectively, and with aligned openings 11d and 11d' located between windows 11e and 11f and between windows 11e and 11f', respectively. When cassette 101 is operatively positioned within compartment 3 of casing 1, a capstan 27 extending upwardly from chassis 3a in back of box-like structure 2 is received in the openings 11c or 11c', depending upon the orientation of the cassette 101 as placed in compartment 3, so as to dispose the capstan 27 immediately in back of the tape 11t exposed at the window 11f or 11f'. Further, a pair of suitably spaced apart locating pins 28 and 28' extend upwardly frm chassis 3a for engagement in the openings 11d and 11d' of the housing 11 of a cassette disposed in compartment 3, and serve to accurately position the cassette within such compartment.

A series of push-buttons 29 (FIGS. 1,2 and 4) are shown to extend from front wall 1a3 of casing section 1a and are selectively operable for establishing respective modes of player 100, for example, the reproducing mode, the fast-forward mode, the rewind mode and the stop mode, by means of suitable mode selecting mechanisms (not shown) contained in the space between the chassis 3a and bottom wall 1a1 and which form no part of the present invention. A rotatable volume control knob 30 is mounted on bottom wall 1a1 adjacent a corner of casing 1 to which box-like structure 2 extends (FIGS. 2 and 3). Further, switch actuators 31 and 32 (FIG. 1) extend from one of the side walls 1a2 to permit user control of associated circuits, for example, circuits adapting the player 100 for use with different types of magnetic tapes, and a Dolby noise-reduction circuit, respectively.

Leaf springs 33 (FIG. 4) may extend through cutouts 4a' (FIG. 5) in the base portion of guide bracket 4 so that, when a cassette 101 is disposed in compartment 3, leaf springs 33 will act against the long side of cassette housing 11 remote from the side having windows 11e, 11f and 11f' for urging the cassette housing forwardly, that is, in the direction toward box-like structure 2. As shown particularly on FIG. 9, the box-like structure 2 has a top wall 15 extending rearwardly from adjacent the top of front wall 1a3 and a back wall 15' which, when a cassette 101 is operatively positioned in compartment 3 confronts a corresponding portion of the long side of the cassette housing provided with windows 11e, 11f and 11f'. The cassette tape player 100 to which the present invention is shown to be applied is adapted only for reproducing or playback operation, and hence has only a reproducing magnetic head 13 which is suitably mounted within hollow box-like structure 2 at an opening 15a provided in back wall 15' at the middle of compartment 3. Thus, when a cassette 101 is operatively positioned in compartment 3, the reproducing or playback magnetic head 13 is engageable through opening 15a and through the registered middle window 11e of the cassette housing with the tape 11t exposed at such window. Back wall 15' of box-like structure 2 is shown to have another opening 15b located to register, at least partly, with one or the other of the side windows 11f and 11f' of the cassette housing 11 disposed in compartment 3. A pressure roller 14 is suitably mounted within box-like structure 2 and is engageable through opening 15b and the registered window 11f or 11f' with the tape 11t exposed at such window for urging the engaged tape against the capstan 27 extending upwardly in the openings 11c or 11c'.

Further, as shown on FIG. 9, top wall 15 of box-like structure 2 may be provided with a hole 19 through which a screwdriver or other tool may have access to a mechanism (not shown) for adjusting the azimuth angle of head 13. A jack 20 may be provided in the end wall of box-like structure 2 adjacent a side wall 1a2 and is adapted to receive a plug for supplying the output audio signal to headphones (not shown).

In accordance with the present invention, a battery receptacle 15c (FIG. 9), which is preferably integral with box-like structure 2, extends longitudinally from structure 2 across substantially the remainder of the casing 1 for receiving at least one elongated cylindrical battery indicated in dot-dash lines at 16. Each such cylindrical battery 16 is arranged with its longitudinal axis extending parallel to the long side of a cassette housing 11 disposed in compartment 3 which faces back surface 15' of box-like structure 2. A closure 18 is engageable with battery receptacle 15c for retaining and locating the at least one battery 16 in such receptacle. The closure 18 is configured to define, with the receptacle 15c, a battery box 17 which constitutes a box-like extension of the hollow box-like structure 2 and which cooperates with the latter to define a substantially continuous surface across the front of compartment 3 for locating the cassette housing therein.

In the exploded view of FIG. 9, the closure 18 of the battery box 17 is shown to include an inner cover member 21, a latch 22 and an outer cover member 23. Inner cover member 21 is shown to be formed with right-angularly related wall portions 21' and 21''. Relatively shallow, communicating grooves 21a and 21b are formed in the outer surfaces of wall portions 21' and 21'', respectively, for accommodating the latch 22, as hereinafter described. Battery receptacle 15c has fixed end walls provided, near the top portions thereof, with keepers 24 and 25. Projections 21c extend from the end of wall portion 21' of inner cover member 21 which is remote from groove 21a and such projections 21c are engageable in keeper 24.

Latch 22 which is desirably formed of a resilient plastic or resin is shown to include an elongated body 22a slidable in groove 21a and having a locking end portion 22a' adapted to project from groove 21a beyond the adjacent end of wall portion 21' for engagement with keeper 25. Extending from elongated body 22a, at the end of the latter remote from locking end portion 22a', is a spring portion 22a'' which is receivable in an enlarged inner part 21a' of groove 21a and which acts against an end edge surface of such inner groove parts 21a' for longitudinally displacing latch 22 in the direction for projecting its locking end portion 22a' into engagement with keeper 25. Finally, latch 22 is shown to include an actuating portion 22b depending from one side of body 22a and being slidable in groove 22b of wall portion 21''. The actuating portion 22b is shown to have a raised knurled or roughened surface 22b' by which latch 22 can be manually displaced along grooves 21a and 21b in the direction opposed to the force of spring portion 22a'' for releasing locking end portion 22a' from keeper 25 and thereby permitting removal of closure 18 for insertion or replacement of batteries in battery box 17. The outer or finishing cover member 23 extends over cover member 21 for retaining latch 22 in grooves 21a and 21b. Outer cover member 23 is shown to include right angularly related wall portions 23' and 23" which are superposed on wall portions 21' and 21", respectively, and suitably secured thereto. Wall portion 23" is shown to have an aperture or slot 23a through which raised surface portion 22b' of the actuating portion 22b of latch 22 can extend for manipulation by the user. Outer cover member 23 is dimensioned so that when the assembled closure 18 is installed on receptacle 15c with projections 21c engaging keeper 24 and locking end portion 22a' of latch 22 engaging keeper 25, the exterior surfaces of wall portions 23' and 23" will be substantially flush continuations of the external surfaces of wall portions 15 and 15' of box-like structure 2.

As earlier noted, the cassette tape player 100 to which the present invention is shown applied is capable of only reproducing or playback operation, that is, it is not capable of recording operation. Thus, player 100 does not require or employ an erasing head which would otherwise be disposed at the position occupied by battery box 17 for erasing signals previously recorded on the tape prior to the recording of new signals thereon by the head 13. When a cassette 101 is operatively positioned in compartment 3, the long side of the cassette housing 11 provided with windows 11e, 11f and 11f' is engageable, and accurately located by the contiguous outer surfaces of wall portions 15' and 23". It will be appreciated that, in such case, the surface of wall portion 23" will confront the window 11f or 11f' of the cassette housing through which an erasing head would be engageable with the tape in a cassette tape recording and reproducing apparatus.

By reason of the foregoing, arrangement of the battery box or holder 17 according to this invention, the casing 1, with such battery box accommodated therein, can be reduced in size, and particularly in the thickness thereof. When casing sections 1a and 1b are in their relatively contracted condition, the overall size of player 100 can be substantially that of the cassette housing 11. When casing sections 1a and 1b are extended, the compartment 3 becomes sufficiently large to accommodate the cassette housing 11 while the top wall 5a of cover or lid 5, at its forward edge portion, continues to engage the external surfaces of the contiguous wall portions 15 and 23' for closing compartment 3 with a cassette 101 therein.

Moreover, when cover or lid 5 is pivoted to its opened position and closure 18 is released from engagement with battery receptacle 15c, such receptacle then opens upwardly and rearwardly for ease in removing and installing the battery or batteries 16 in receptacle 15c.

Although an embodiment of this invention has been described in detail herein with reference to the accompanying drawings, it is to be understood that the invention is not limited to that specific embodiment, and that various changes and modifications may be effected therein by one skilled in the art without departing from the scope or spirit of the invention as defined in the appended claims.

What is claimed is:

1. A cassette tape player for use with a cassette having a substantially rectangular housing comprised of opposed panels and a peripheral wall therebetween with windows spaced along a relatively long side of the peripheral wall for exposing tape contained in the housing and guided in a run along said long side, said player having a single head which is adapted for reproducing and comprising:

a casing defining a compartment having a bottom surface for receiving the cassette with one of said panels on said bottom surface and including a hollow, box-like structure extending only partly across the casing above said bottom surface of the compartment to confront a corresponding portion of said long side of a cassette housing disposed in said compartment, said single head being mounted within said hollow, box-like structure, a battery receptacle extending longitudinally from said hollow, box-like structure across substantially the remainder of said casing for receiving at least one elongated cylindrical battery with the longitudinal axis of the latter extending parallel with said long side of the cassette housing in said compartment, and closure means engageable with said battery receptacle for retaining and locating said at least one battery in said receptable and being configured to define, with said receptacle, a box-like extension of said hollow box-like structure which is similarly above said bottom surface of the compartment and cooperates with said box-like structure to define a substantially continuous surface extending along and engaging said long side of the peripheral wall for locating the cassette housing in said compartment, the portion of said surface defined by said hollow box-like structure having at least one opening therein to register, at least partly, with one of said windows of the cassette housing in said compartment, said signle head being engageable through the registered opening and window with the tape in said run for reproducing signals therefrom.

2. A cassette tape player according to claim 1; in which said portion of the surface defined by said hollow box-like structure has another opening therein to register, at least partly, with another of said windows of the cassette housing in said compartment; and further comprising a rotatable capstan upstanding in said compartment adjacent said other opening to extend into the cassette housing in said compartment at a location in back of the tape exposed at said other window, and a pressure roller mounted within said hollow box-like structure and engageable through said other registered opening and window with the tape for urging the latter against said capstan.

3. A cassette tape player according to claim 2; in which said hollow box-like structure and said battery receptacle are integral with each other, and said closure means includes a cover member and latch means for releasably securing said cover member on said receptacle.

4. A cassette tape player according to claim 3; in which said hollow, box-like structure extends approximately halfway across said casing, has said one opening for the reproducing head is located substantially midway between opposite sides of said casing.

5. A cassette tape player according to claim 1; in which said casing includes a main section having a base, a front wall extending across said base and side walls extending along opposite sides of said base from adjacent ends of said front wall, an auxiliary section including a back wall and side wall extensions, means slidably connecting with said side wall extension with said side walls of the main section for permitting increasing and decreasing of the distance between said front and back walls and thereby expanding and contracting, respectively, said compartment in the casing, a lid, and means pivotally mounting said lid on said auxiliary section for pivotal movement relative to the latter between opened and closed positions; and in which said hollow, box-like structure and said box-like extension thereof are disposed in back of said front wall of the main section, said lid rests slidably on top of said hollow, box-like sturcture and said box-like extension during said expanding and contracting of the compartment with said lid in its closed position, and said compartment is dimensioned to receive the cassette housing only in its expanded condition.

6. A cassette tape player according to claim 5; in which said side walls of the main section and said side wall extensions and back wall of the auxiliary section have a height substantially less than the height of said front wall and said hollow, box-like sturcture and box-like extension thereof, and said lid includes a depending side and back flanges which abut said side walls and side wall extensions and said back wall, respectivvely, in said closed position of the lid.

7. A cassette tape player according to claim 6; in which the cassette housing has projections extending from its peripheral wall at the opposed relatively short sides, and said lid has means engageable with said projections on a cassette housing in said compartment for lifting the cassette therefrom in response to movement of the lid to its opened position.

8. A cassette tape player according to claim 7; in which said means engageable with the projections define grooves adjacent opposite sides of said lid opening laterally toward each other and also opening toward the front of the lid, and at least one of said grooves is formed in a laterally resilient tab depending from the lid and spaced inwardly from the adjacent one of said side flanges, said resilient tab having a bevelled lower edge to snap over the projection at the respective short side of the cassette housing when the lid is closed with the cassette housing already in said compartment.

9. A cassette tape player according to claim 1; in which hollow box-like structure and said battery receptacle are integral with each other; said hollow box-like structure includes right-angularly related wall portions facing upwardly and rearwardly toward said compartment; said receptacle includes fixed end walls adjacent said hollow box-like structure and the end of said receptacle remote therefrom, and a front wall so that, with said closure means removed, said receptacle opens upwardly and toward said compartment for ease in installing said at least one battery in said receptacle; and said closure means includes a cover member having right-angularly related wall portions and being engageable with said receptacle to face said wall portions of the cover member upwardly and toward said compartment, respectively, as substantially flush continuations of said wall portions of the hollow box-like structure, and latch means for releasably securing said cover member on said receptacle.

10. A cassette tape player according to claim 9; in which said cover member includes an inner cover member and an outer cover member superposed thereon, said inner cover member has a shallow groove opening at one end of the cover member and projections at the other end, said end walls of the receptacle have respective keepers with said projections at the other end of said cover member being engageable with one of said keepers, and said latch means includes a slidable lock member movable in said shallow groove and having, as integral parts, a spring portion, an actuating portion and a projecting end portion urged by said spring portion to extend from said groove for locking engagement with the other of said keepers, said outer cover member having an aperture exposing said actuating portion by which said lock member can be displaced for releasing said projecting end portion from said other keeper.

* * * * *